June 20, 1939. R. L. WILSON 2,162,770
BRAKE SHOE
Filed Jan. 28, 1938 7 Sheets-Sheet 1
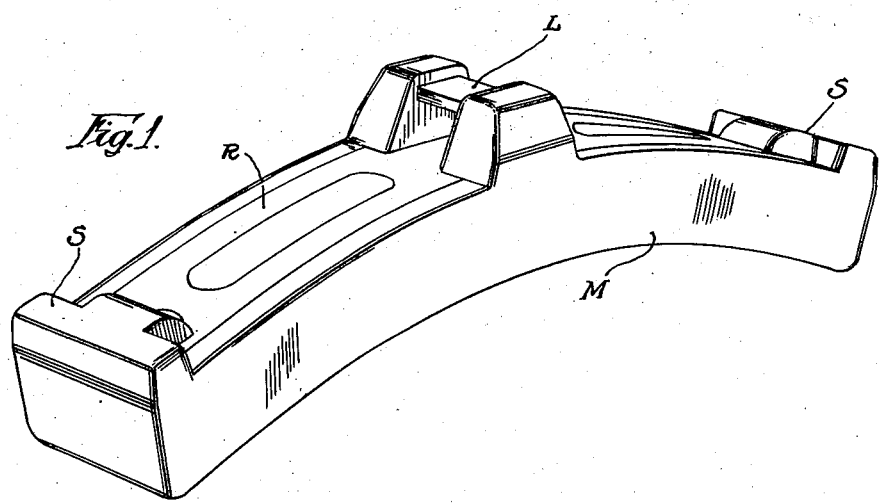
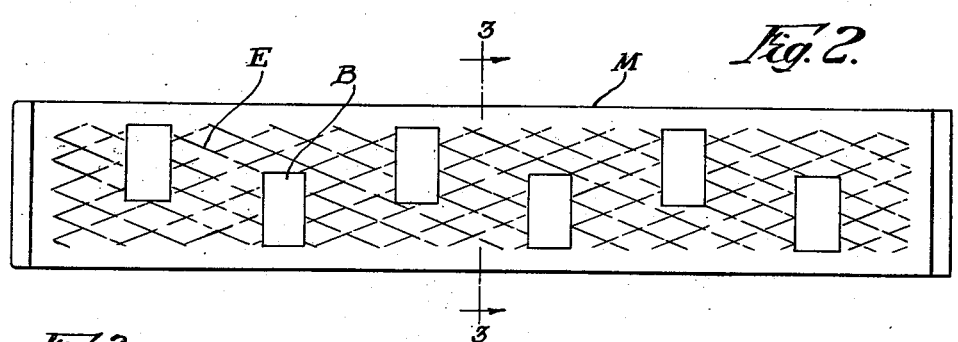
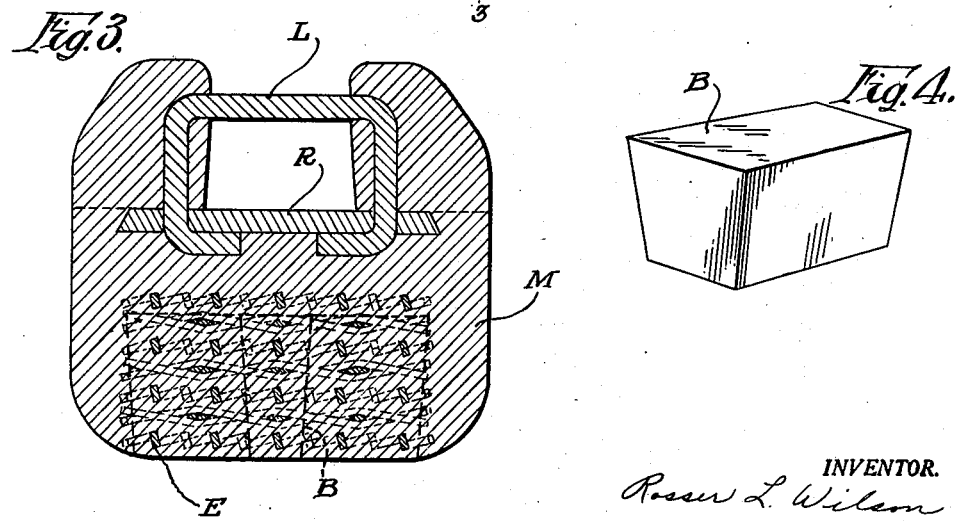
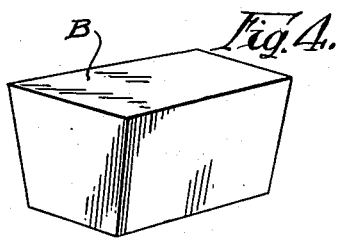
INVENTOR.
Rosser L. Wilson
BY Belt, Wallace and Cannon
ATTORNEYS.

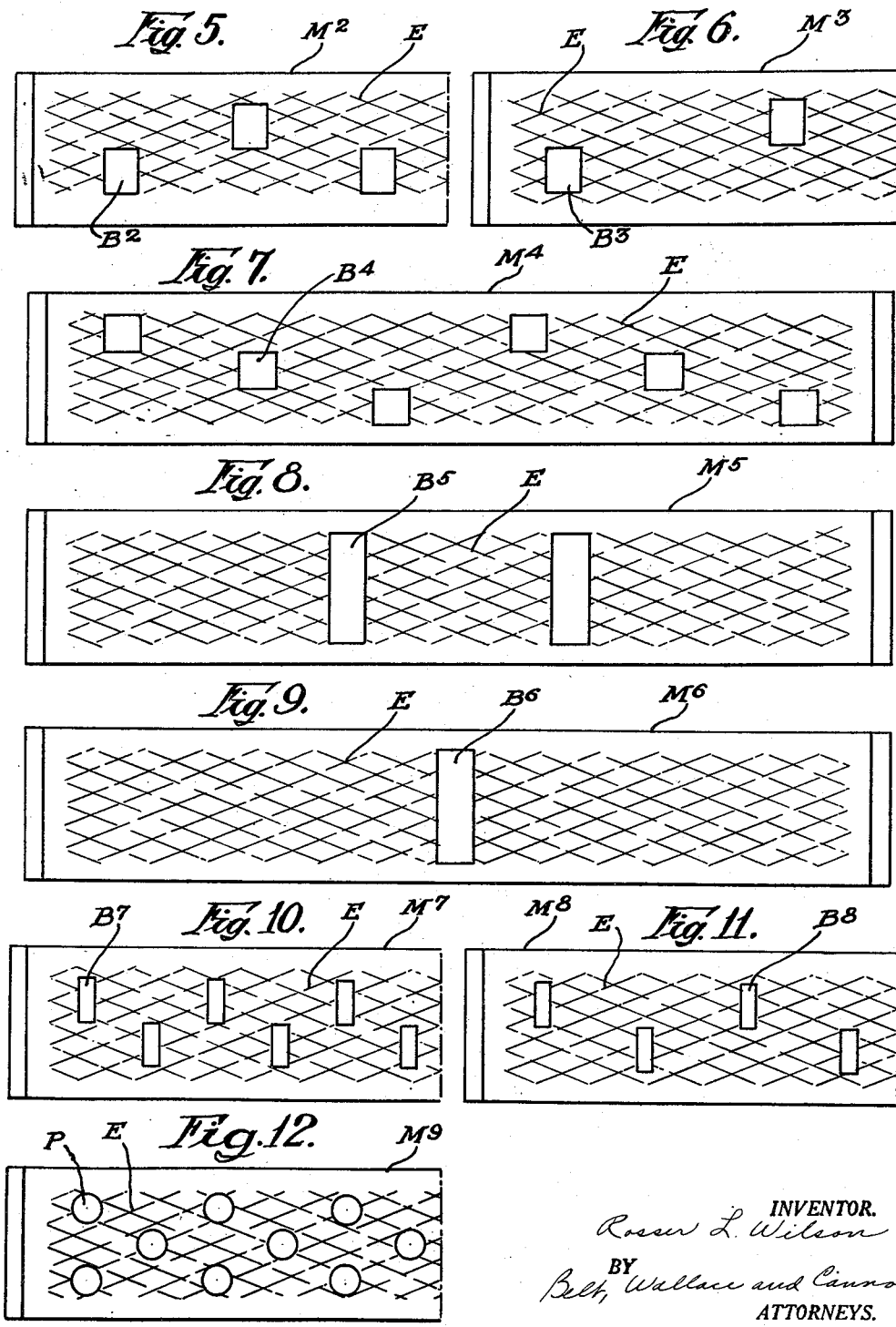

June 20, 1939.  R. L. WILSON  2,162,770
BRAKE SHOE
Filed Jan. 28, 1938  7 Sheets-Sheet 3

INVENTOR.
Rosser L. Wilson
BY
Bell, Wallace and Cannon
ATTORNEYS.

June 20, 1939.  R. L. WILSON  2,162,770
BRAKE SHOE
Filed Jan. 28, 1938  7 Sheets-Sheet 5

INVENTOR.
Rosser L. Wilson
BY
Beek, Wallace and Cannon
ATTORNEYS.

June 20, 1939.  R. L. WILSON  2,162,770
BRAKE SHOE
Filed Jan. 28, 1938    7 Sheets-Sheet 6
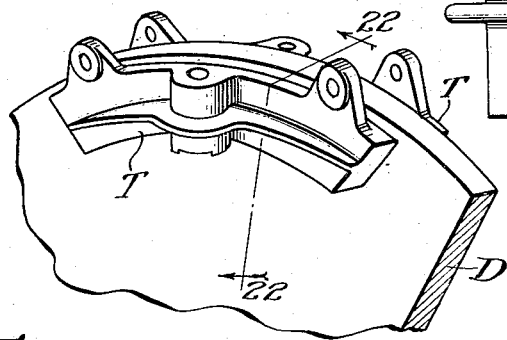
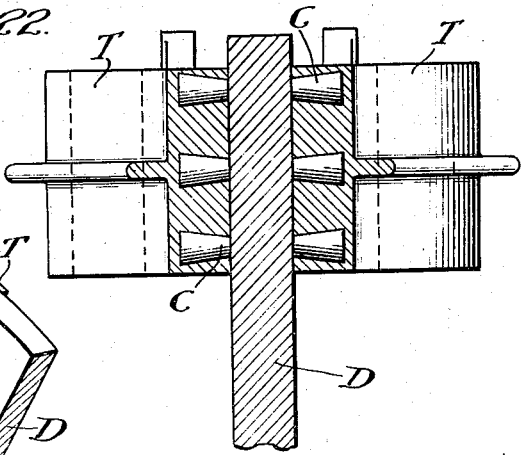
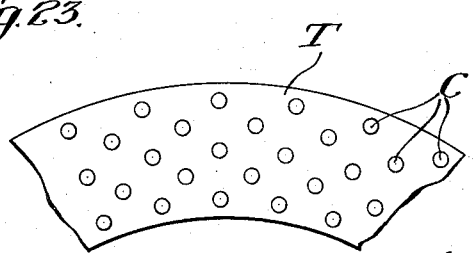
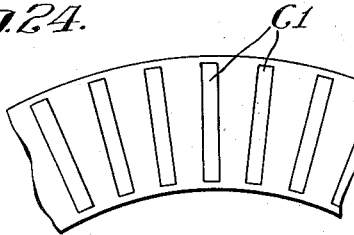
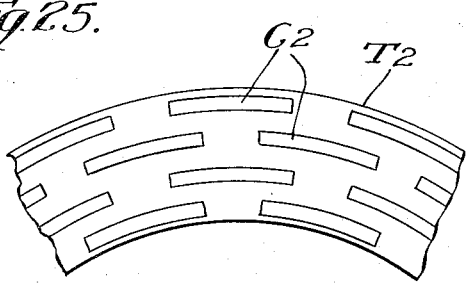
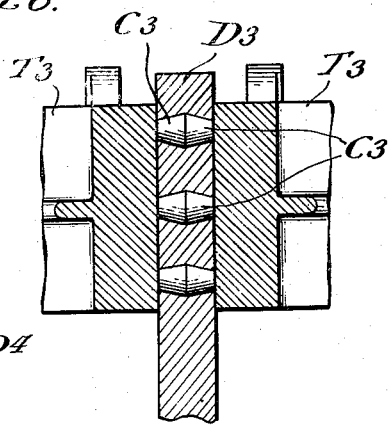
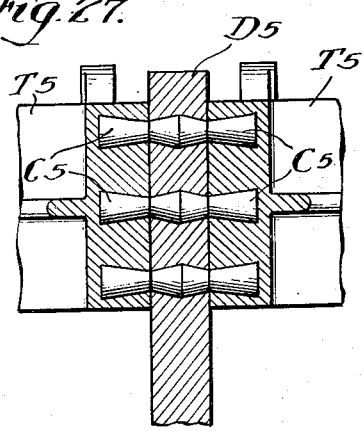
INVENTOR.
Rossier L. Wilson
BY Belt, Wallace and Cannon
ATTORNEYS June 20, 1939.  R. L. WILSON  2,162,770
BRAKE SHOE
Filed Jan. 28, 1938  7 Sheets-Sheet 7
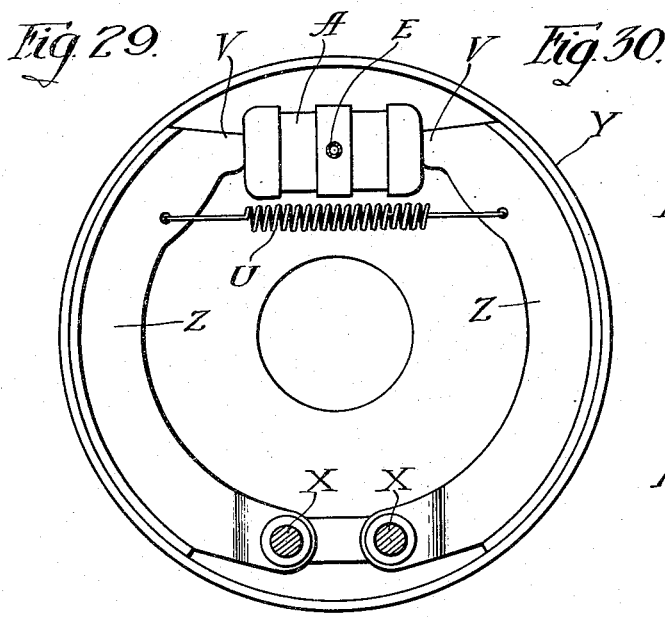
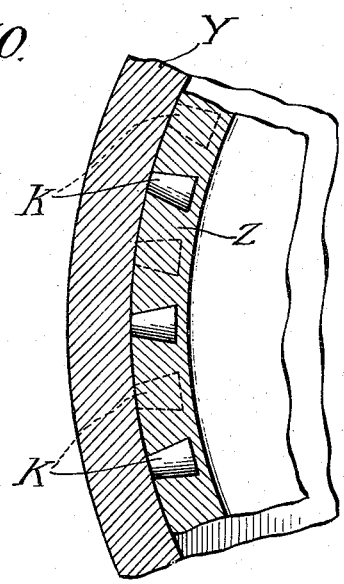
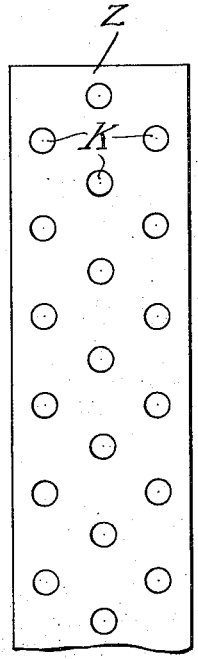
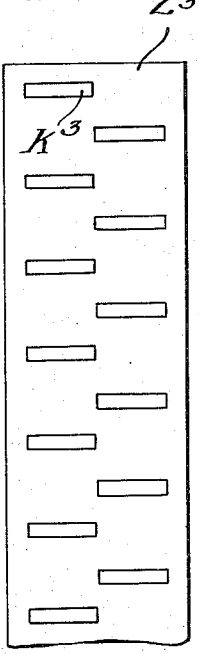
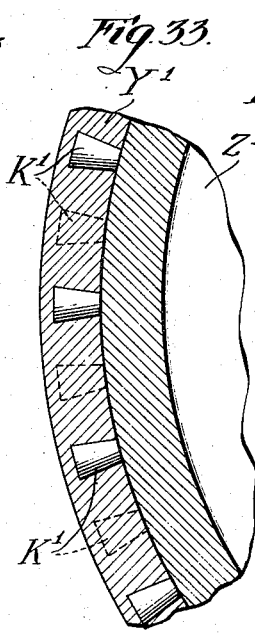
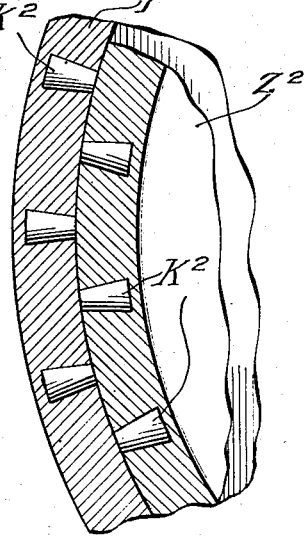
INVENTOR.
Rosser L. Wilson
BY Belt, Wallace and Cannon
ATTORNEYS.

Patented June 20, 1939

2,162,770

UNITED STATES PATENT OFFICE 2,162,770

BRAKE SHOE

Rosser L. Wilson, Mahwah, N. J., assignor to The American Brake Shoe and Foundry Company, New York, N. Y., a corporation of Delaware Application January 28, 1938, Serial No. 187,528

34 Claims. (Cl. 188—256)

This application is a continuation in part of my allowed application, Serial No. 148,593, filed June 16, 1937.

This invention relates to brake shoes suitable for use on railway equipment and the like and especially to cast metallic shoes of this kind.

The present relatively high operating speeds of railway equipment, the reduction of the number of wheels on such equipment, particularly on so-called articulated trains, and kindred developments in the railway art, have necessitated resort to heavy duty braking and it has been found that this ofttimes results in increased wear of the brake shoes and sometimes in the depositing or smearing of brake shoe metal on the treads of the wheels with which the shoes cooperate. Metal so smeared may impair the braking action during the time it adheres to the tread and before it is removed from the tread by the rolling action of the wheel on the rail. Furthermore, it has been found in heavy duty braking that the friction characteristics of brake shoes may vary and this makes it difficult to control braking operations.

Heavy duty braking on railway equipment may be entailed in stopping from high operating speeds or under heavy wheel load conditions, high braking pressures, when frequent stops from comparatively high speeds are required, or in prolonged brake applications as in the descent of long grades, or in a combination of two or more or all of these conditions. One pronounced condition prevailing in heavy duty braking is the generation of high temperatures at the friction surfaces of the brake shoes as the kinetic energy is transformed into heat energy in the braking operation. It is not uncommon to encounter temperatures sufficient to melt the metal of which brake shoes are made.

One effect of subjecting the metal at the friction surface of the brake shoes to such high temperatures is that the resultantly extremely hot and consequently weak metal is thrown off in a shower from the end of the shoe faced in the direction of rotation of the wheel with which the shoe is engaged. Some of the metal so thrown off is sometimes at such a high temperature that as soon as it encounters air beyond the end of the shoe it bursts into flame. Such a shower of molten and burning metal may be called a flaming condition. It is known that whenever such a flaming condition arises the rate of wear of the shoe materially increases. Moreover, there are circumstances under which the rate of wear in heavy duty braking is greater than normal even when a flaming condition does not arise.

Hence one of the important objects of this invention is to reduce the rate of wear of brake shoes attending heavy duty braking and to also beneficially affect the rate of wear under certain circumstances in ordinary braking operation.

It has been found that the total stop distances of stops effected from the same operating speed may vary and especially when a stop from a relatively high speed is followed by a stop from a lower speed. These conditions may be similated by comparing the total stop distances involved in braking operations effected at successively increasing speeds up to a certain top speed and then from this top speed back through successively decreasing operating speeds. Where such a comparison of the total stop distances is made under heavy duty braking conditions at operating speeds starting, for example, at an operating speed of forty miles per hour and successively increased in steps of ten miles per hour up to say one hundred miles per hour and then through operating speeds successively decreasing in steps of ten miles per hour, the representative curve for the successively decreasing speeds does not overlie the representative curve for the successively increasing speeds throughout the length of the curves which means that the total stop distance from particular speeds may vary under operating conditions especially when a second stop follows a stop made under severe conditions.

Under operating conditions stops are made from random speeds which makes it desirable that the stopping distances from particular speeds be substantially uniform. But it has been found that in heavy duty braking there may be a comparatively wide variation in the length of stops made from the same speed under operating conditions especially when a second stop follows a stop made under severe heavy duty braking conditions.

Therefore another important object of this invention is to render the total stop distances for stops effected by a brake shoe from various operating speeds substantially uniform for each particular operating speed irrespective of the order in which successive stops are effected.

The adjustments in brake control equipment are calculated to be such that the friction between the shoe and wheel is always less than the friction between the wheel and the rail. The controls are adjusted to obtain the highest efficiency in braking but at the same time avoid sliding the wheels on the rails. This adjustment, however, is predicated upon the friction characteristics of the shoe remaining substantially uniform. Thus, if there is an unpredictable increase in the friction between the shoe and the wheel, the shoe may cause the wheel to slide along the rail. On the other hand, if there is an unpredictable decrease in the friction between the shoe and wheel, the efficiency of the braking operation is lowered. It is known that, especially in heavy duty braking, the friction characteristics of a brake shoe may vary.

The most objectionable variation in the friction characteristics of a shoe is the uncontrolled increase in friction that attends a severe brake operation. This uncontrolled increase in friction may arise shortly after the start of the braking operation and remain uniform throughout the operation, but it may not arise until well after the start of the operation. And again, it may appear and then diminish as the operation proceeds. From this, it will be seen that the behavior of such a variation in friction cannot be predicted and, therefore, the braking action is difficult to control.

In view of this, still further important objects of this invention are to reduce the tendency of brake shoes toward exhibiting an uncontrolled increase in friction and to so stabilize the friction characteristics that substantial uniformity may be realized wherefore the braking action may be rendered substantially uniform and more readily controlled during a braking operation.

Abnormal conditions, such as the above described flaming condition, may tend to increase the friction of a brake shoe. However, if the friction could be increased under normal conditions there could be a reduction in the pressure on the shoe without impairing the retarding effect under normal conditions, other conditions being equal; and this would enable the use of lighter braking equipment than that now required.

Thus, another object of this invention is to increase the friction of a brake shoe in normal brake shoe action.

The previously mentioned uncontrolled increase in friction is usually attended by the previously described flaming condition and an increase in the rate of wear of the shoe. There may be, however, in such circumstances, under test conditions in the absence of the rolling action of the wheel on the rail, a reduction in the length of the total stop distance. The benefits arising from the reduction in the length of the total stop distance in such instances are, however, offset by the objections arising from the presence of the uncontrolled increase in friction and the increased rate of wear. Under certain circumstances in the presence of the rolling action of the wheel on the rail the aforesaid uncontrolled increase in friction might result in sliding of the wheel along the rail and attendant damage to wheel which would have the effect of lengthening the total stop distance. It is desirable therefore to shorten the length of the total stop distance that can be obtained without having the flaming condition arise.

Thus, another object of this invention is to reduce the length of total stop distance that can be obtained without the above referred to flaming condition and its attendant increase in the rate of wear being present.

It has been found that brake shoe metal is ofttimes deposited or smeared on the treads of wheels with which brake shoes cooperate in heavy duty braking operation. Such smear on the treads of the wheels may interfere with the braking operation especially since it may substantially alter the friction characteristics. Of course, such smear is removed from the wheel tread by the rolling action of the wheel and on the rail, but may not be entirely removed during the course of a particular heavy duty operation. Inasmuch as such smear is ofttimes objectionable, yet further important objects of this invention are to substantially reduce the tendency of brake shoe metal to smear upon the treads of wheels and to insure that any metal so smeared will be more promptly removed from the treads by the rolling action of the wheels on the rails.

Heavy duty braking gives rise to other problems and I have found that the difficulties attending these problems may be substantially eliminated or materially mitigated and that the foregoing objects may be attained by incorporating heat-resistant carbon in brake shoes to be used in heavy duty braking and so to do constitutes still another important object of this invention, and objects ancillary to this are to expedite the incorporation of heat-resistant carbon in brake shoes and to provide a brake shoe of simple and economical construction and which will be efficient and positive in operation.

Still another object of this invention is to incorporate heat-resistant carbon in conventional railway brake shoes as well as in brake shoes and brake elements of other construction and adapted for any frictional braking use.

While in the foregoing discussion and in the following description of my invention I have referred and will refer to heavy duty braking, it is to be understood that my invention is not limited to heavy duty braking inasmuch as it will have a beneficial effect in normal braking but since the beneficial results accruing from my invention are more pronounced and as the need therefor is greater in heavy duty braking I have specifically referred to such braking in the foregoing discussion and will so do in the following description. But this however is not to be taken as a limitation of the invention for it is susceptible of use in shoes adapted for use under a wide variety of conditions.

Other and more specific objects of my invention will be brought out in the following description wherein reference is made to the accompanying drawings in which Fig. 1 is a perspective view of a conventional railway brake shoe of the kind in which my invention may be incorporated;

Fig. 2 is a bottom plan view of the shoe such as that shown in Fig. 1;

Fig. 3 is a vertical transverse sectional view taken substantially on the line 3—3 on Fig. 2;

Fig. 4 is a perspective view of a block of heat-resistant carbon such as is utilized in the shoe shown in Fig. 2;

Figs. 5 and 6 are fragmentary views similar to Fig. 2 and showing modified forms of construction;

Figs. 7, 8 and 9 are further views similar to Fig. 2 and showing further modified forms of construction;

Figs. 10, 11 and 12 are views similar to Figs. 5 and 6 and showing still further modified forms of construction;

Fig. 21 is a fragmentary perspective view of an exemplary disc brake assembly embodying my invention;

Fig. 22 is a transverse sectional view, drawn to an enlarged scale, taken substantially on the line 22—22 on Fig. 21;

Fig. 23 is a fragmentary elevational view of the wearing face of a shoe suitable for use in the brake assembly shown in Fig. 21;

Figs. 24 and 25 are views similar to Fig. 23 and showing other modified forms of my invention;

Figs. 26 and 27 are views similar to Fig. 22 and showing still further modified forms of my invention;

Fig. 28 is a fragmentary transverse sectional view through a disc similar to that shown in Fig. 21 and embodying another modified form of my invention;

Fig. 29 is a side view of still another form of brake assembly embodying my invention;

Fig. 30 is a fragmentary sectional view, drawn to an enlarged scale, longitudinally through the drum and shoe of the brake assembly shown in Fig. 29;

Figs. 31 and 32 are fragmentary elevational views of the wearing face of the shoes suitable for use in the brake assembly shown in Fig. 29 and showing modified forms of my invention; and Figs. 33 and 34 are views similar to Fig. 30 and showing still further modified forms of my invention.

Figure 13:
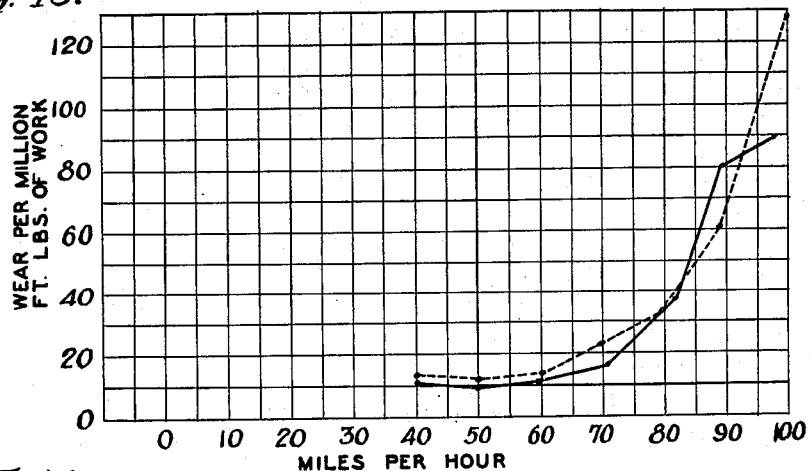
Figs. 13 to 20 are diagrammatic views illustrative of the performance characteristics of brake shoes of both the prior art and those embodying my invention.

Referring to the accompanying drawings and more particularly to Figs. 1 to 12, inclusive, I have shown my invention incorporated in a conventional railway brake shoe that comprises a main body M of cast iron having a reenforcing back R embedded in the rear face thereof. The shoe includes a center attaching lug L located on its back midway between its ends and also the usual end stops S positioned on the back at the ends of the shoe. Furthermore, as will be explained more fully hereinafter, it is advantageous for the shoe to have a reenforcing insert incorporated in the body M thereof. The insert E shown comprises a plurality of layers of expanded metal as disclosed in Sargent Patent 587,493, patented August 3, 1897. It is to be understood, however, that my invention is not limited to use with a shoe of the just described kind inasmuch as it may be used in a shoe of any construction suitable for the purpose for which it is to be used.

The shoe illustrated in Figs. 1, 2 and 3 has a plurality of blocks B cast in place in the body M thereof. When an expanded metal insert E is used openings are provided in the insert to receive and support the blocks during casting of the body. If the shoe should not have an insert, chaplets or the like would be employed to support the blocks B during casting. As best shown in Fig. 4, the blocks B are preferably substantially rectangular in cross-section and in the form of the frustum of a pyramid. The blocks are so mounted in the insert that when they are cast in the metal of the body of the shoe the smaller of the opposite flat faces thereof are disposed in the wearing face of the shoe, the inclined sides of the blocks preventing displacement thereof from the body. By reason of this arrangement the blocks remain exposed on the wearing face of the shoe as the shoe wears away in use.

In the form of the invention shown in Fig. 2, six blocks B are incorporated in the shoe. These blocks are positioned in uniformly spaced apart relation one from the other and the ends of the shoe. Furthermore, the outwardly disposed edges of the blocks are spaced inwardly from the side edges of the shoe and the inwardly disposed edges of the blocks are disposed beyond the longitudinal center line of the shoe whereby, longitudinally of the shoe, parts of the blocks are in overlapping relation.

The blocks B which are thus cast in place in the shoe are made of "heat-resistant carbon". Where, in this description and in the appended claims, the term "heat-resistant carbon" is used I refer to manufactured forms of carbon made from raw materials such as coal, coke, petroleum coke, pitch coke, retort carbon or artificial or natural graphite, or the like processed by the conventional methods employed in the manufacture of electric furnace electrodes irrespective as to whether in their final condition they are of the amorphous, semi-graphitic or graphitic variety of carbon, or to the manufactured forms of carbon made by the conventional processes employed in the manufacture of electrical machinery brush stock or to the related forms of manufactured carbon employed in electrical contacts, clutch plates or steam turbine packing rings irrespective again as to whether in the final condition they are of amorphous, semi-graphitic or graphitic variety of carbon or a combination of these varieties.

As an example of what is meant by the just referred to conventional methods, a low ash petroleum coke is selected as the base material. This material is first calcined, which operation involves the removal of the volatile products, this being a result of a processing operation involving heating of the material to a temperature of approximately 1100° C. This is followed by comminution and grinding to a predetermined particle size, screening the ground product and apportioning selected quantities of the screened materials of various particle sizes to give a high strength aggregate, mixing these selected materials with a binder and then forming the stock by the usual methods of molding or extrusion. The binders employed are either tars or pitches. After forming such so-called "green stock" it is subjected to a baking operation for the formation of a strong readily handled product of sufficient mechanical strength to withstand grinding, machining or other fabricating operations. The resultant product at this stage is an amorphous solid material suitable for use in this invention. Further processing involving furnace operations where the temperatures reached exceed 1100° C. gives an over-baked or semi-graphitic product which is likewise suitable for use in this invention. Still further operations involving heating effects, accomplished only through the use of electric furnaces, produce a material which is entirely graphitic in nature and which is also suitable for use in this invention. In the latter case electrical resistance furnaces are employed wherein the material, during processing, may reach temperatures up to and exceeding 2100° C.

As to identifying characteristics of the materials included within the term "heat-resistant carbon" they consist substantially of the chemical element, carbon, in forms which are susceptible to shaping to desired dimensions by the mechanical operations of machining or grinding and show electrical characteristics such as electrical resistance over a range from .0003 to .002 ohm per inch cube, hardness as measured on the Shore sceleroscope of the order of 15 to 100, compressive strength of the order of 1000 to 9000 pounds per square inch, and tensile strength of the order of 800 to 1600 pounds per square inch. As to further characteristics the "heat-resistant carbon" in manufactured forms shows an apparent density of 1.4 to 1.7 and a weight in pounds per cubic foot of 90 to 110. All of these forms may have molten metal cast about them without substantial loss of substance or form.

In order to have the desired heat resistance in the carbon it is necessary to have the proper physical characteristics. This may be illustrated by the following:

A porous material, made of any carbonaceous product, as a result of its porosity is readily susceptible to destructive action by oxidation processes. Thus, when a finely divided carbonaceous material, such as lamp black, is subjected to experimental processing, it will be found that this material is susceptible to rapid oxidation at temperatures as low as 200° to 300° C. However, the denser the material the more resistant it is to destructive action of atmospheric oxygen or, in other words, the resistance to the destructive influence of atmospheric oxygen is related to the porosity of the material and the lower the porosity the less chance for the destructive action of atmospheric oxygen to function. This is due to the fact that oxygen can and will infiltrate into and through the pores of a porous carbonaceous material and in so doing will attack the carbon behind the exposed or working surface thereof, rather than being confined to an attack upon the exposed or working surface as in the case of carbonaceous material such as is contemplated by the present invention.

Hence controlled manufacturing processes on carbonaceous materials which reduce porosity to a minimum result in increased resistance to the destructive action of atmospheric oxygen resulting from infiltration. The tensile strength of carbon is related to its porosity or, in other words, a porous material will have low tensile strength. Thus, the tensile strength of a manufactured carbon block is related to and dependent upon the porosity of the material. There is, therefore, a definite co-relation between the tensile strength of carbonaceous material and its porosity and, in turn, the heat resistance or susceptibility or lack of the same to the aforesaid destructive action of atmospheric oxygen. Hence the tensile strength of carbonaceous material or, specifically, a carbon block or insert as contemplated by this invention may be taken as and is a criterion of its heat resistance or relative susceptibility to the destruction action of atmospheric oxygen. Or more briefly stated, heat resistance may be said to be a function of the tensile strength which will therefore be referred to hereinafter as the primary identifying characteristic of the heat resistant carbon which is within the ambit of my invention.

Moreover, a carbonaceous material having the tensile strength herein specified will possess sufficient resistance to mechanical stress and vibration, as well as sufficient resistance to heat, to withstand the severe service to which it is put in heavy duty braking.

I prefer to provide heat-resistant carbon in brake shoes by forming blocks therefrom and these blocks may be cut from the forms or plates of the base material or they may be preformed if so desired. It is to be understood, however, that my invention is not limited to the use of substantially rectangular blocks inasmuch as the particular cross-section of the blocks is of no importance, and furthermore the carbon may be incorporated in the shoes in other ways than by being cast in place, as will be explained more fully hereinafter.

In Figs. 5 to 12, inclusive, I have illustrated various ways in which blocks of heat-resistant carbon may be incorporated in brake shoes to be disposed in the wearing face thereof initially and as the shoe wears away in service.

Thus in Fig. 5 a shoe comprising a body M2 is illustrated fragmentally. In this shoe six blocks B2 of suitable material are disposed in the wearing face of the shoe. Preferably the blocks are disposed in spaced apart relation with respect to each other and the ends of the body M2. The outwardly disposed edges of the blocks are arranged in spaced relation with the side edges of the body and in this instance the inwardly disposed edges of the blocks lie on the longitudinal center line of the body.

A similar arrangement is shown in Fig. 6 except that only four blocks B3 are incorporated in the body M3 of the shoe there illustrated and in this instance the outermost of the blocks B3 are disposed closer to the ends of the shoe than the amount of the uniform spacing of the blocks one from the other along the length of the shoe.

In Fig. 7 I have illustrated an arrangement which has been found to be suitable and herein six blocks B4 are incorporated in the body M4. These blocks are preferably mounted in diagonal relation along a diagonal line extending from one corner of the shoe to the center of the opposite side of the shoe. Furthermore, in this instance the edges of the blocks along each diagonal line are arranged transversely across the shoe so that the edge of one block is in longitudinal alignment with the juxtaposed edge of the adjacent block.

In Fig. 8 still another arrangement is shown. Herein two relatively elongated blocks B5 are incorporated in the body M5 and preferably these blocks are equidistantly spaced on opposite sides of a plane midway between the ends of the body M5, said blocks preferably being disposed closer to said plane than to the ends of the body. The outwardly disposed edges of these blocks are also spaced inwardly of the side edges of the shoe.

A somewhat similar arrangement is shown in Fig. 9 wherein a single elongated block B6 is incorporated in the body M6 midway between the ends of the body.

In Fig. 10 the manner in which twelve blocks as B7 may be conveniently arranged in the body M7 of a shoe is illustrated, six of the blocks being arranged on one side of the longitudinal center line of the body M7 and the other six being arranged on the opposite side of said center line, the inwardly disposed edges of all of said blocks lying on said center line and the outwardly disposed edges of the blocks being inwardly of the side edges of the shoe.

The arrangement shown in Fig. 11 is similar to that shown in Fig. 10 except that eight blocks B8 are incorporated in the body M8 of a shoe, and here again the inwardly disposed edges of the blocks B8 lie on the longitudinal center line of the shoe so that the blocks do not overlap.

In Fig. 12 a somewhat different arrangement is illustrated. Herein I have shown how truncated cones P made of a material similar to that of which the blocks B are made may be incorporated in the body M9 of a brake shoe, such cones preferably being tapered from end to end and having the smaller ends disposed in the wearing face of the shoe to insure against displacement from the body M9.

While I have illustrated a plurality of ways in which blocks or truncated cones of carbon can be incorporated in the bodies of brake shoes, it is to be understood that this showing is by no means exhaustive. However, each of the illustrated forms has been found to be satisfactory although, as will be explained hereinafter, the efficiency of some forms is greater than that of others depending upon the conditions of use.

It is also to be understood however that the heat-resistant carbon might be incorporated in the body of the shoe in many other ways as, for example, finely divided metal and carbon might be pressed to provide a shoe and so to do would afford a shoe having a very uniform dispersion of the carbon throughout the body of the shoe. Moreover, blocks of carbon might be threaded into tapped openings in the body of the shoe or carbon might be otherwise provided in openings in the shoe body.

I have found that by incorporating heat-resistant carbon in the body of a brake shoe so as to be disposed on the friction face thereof initially and as the shoe wears away in use, the rate of wear is substantially reduced, the friction of the shoe is rendered more uniform and also the friction is increased under normal conditions, the tendency toward the development of an uncontrolled increase in friction is very materially reduced, and any brake shoe metal that may be smeared on the tread of the wheel with which the shoe cooperates is promptly removed by the rolling action of the wheel on the rail.

To better explain the results that are realized by my invention reference may be had to the graphs shown in Figs. 13 to 20, inclusive.

Figure 16:
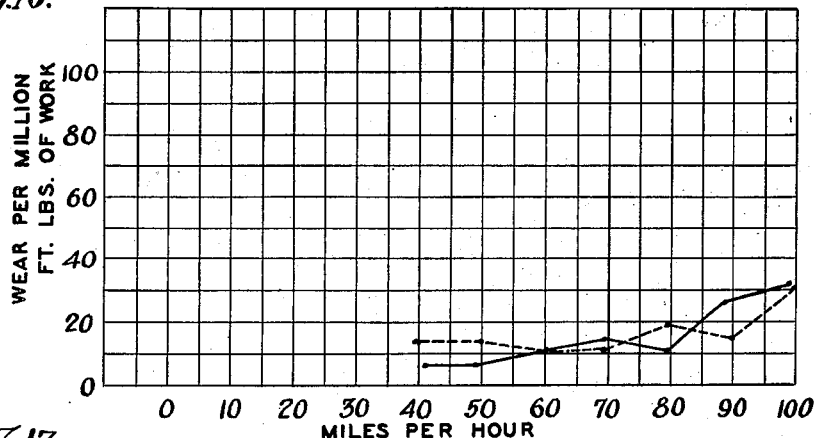

Thus to demonstrate that the incorporation of heat-resistant carbon effects a substantial reduction in the rate of wear reference is directed to Figs. 13 and 16.

In Fig. 13 the broken line curve (------) illustrates the rate of wear plotted in an arbitrary scale on the axis of ordinates of a cast iron brake shoe of the type shown in Fig. 1 but not having an insert like the insert E therein and not having heat-resistant carbon incorporated therein. The broken-line curve (------) in Fig. 16 illustrates the rate of wear plotted in an arbitrary scale on the axis of ordinates of an identical shoe but having heat-resistant carbon incorporated therein in the manner shown in Fig. 2. The miles per hour is plotted on the axis of abscissas for the curves of both Figs. 13 and 16. Furthermore, in plotting these curves, shoes cast of metal from the same ladle and having a Brinell hardness of approximately 425 were employed and these shoes were subjected to identical conditions in so far as wheel load, pressure on the shoe, and the like are concerned and the shoes were of identical dimensions.

A comparison of the broken-line curves of Figs. 13 and 16 at once demonstrates the substantial reduction effected in the rate of wear by incorporating heat-resistant carbon in a brake shoe for it will be noted that at, for example, one hundred miles per hour on the basis of the arbitrary scale, the rate of wear of a shoe of the foregoing type and having heat-resistant carbon incorporated therein is thirty whereas the rate of wear for an identical shoe but not having such carbon incorporated therein is substantially one hundred thirty on the arbitrary scale.

The full-line curve (———) in Fig. 13 illustrates the rate of wear on an arbitrary scale of a cast iron brake shoe of the type shown in Fig. 1 and having an insert like the insert E therein but not having heat-resistant carbon incorporated therein. The full-line curve (———) in Fig. 16 illustrates the rate of wear on an arbitrary scale of an identical shoe but having heat-resistant carbon incorporated therein in the manner shown in Fig. 2. Here again in plotting these curves shoes cast of metal from the same ladle and having a Brinell hardness of approximately 425 were employed and these shoes were subjected to identical conditions in so far as wheel load, pressure on the shoe, and the like are concerned and the shoes were of identical dimensions.

A comparison of the full-line curves of Figs. 13 and 16 at once demonstrates the substantial reduction effected in the rate of wear by incorporating heat-resistant carbon in a brake shoe having an insert such as the insert E therein for it will be noted that at, for example, approximately one hundred miles per hour on the basis of the arbitrary scale, the rate of wear of a shoe of the just-described type and having heat-resistant carbon incorporated therein is substantially thirty whereas the rate of wear for an identical shoe but not having heat-resistant carbon incorporated therein is substantially ninety on the arbitrary scale.

A further comparison of the curves of Figs. 13 and 16 demonstrates that the benefits accruing from the presence of heat-resistant carbon in a brake shoe is greatest at high speeds, that is, speeds above from sixty to seventy miles per hour.

Figure 14:
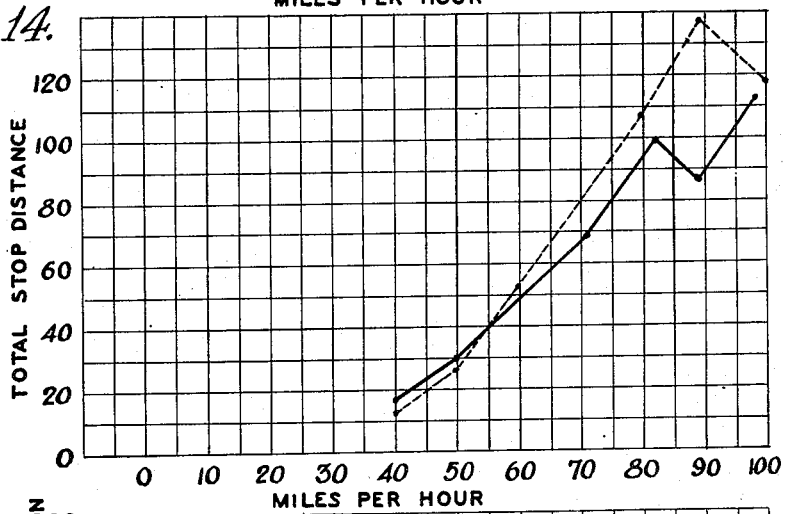
Figure 17:
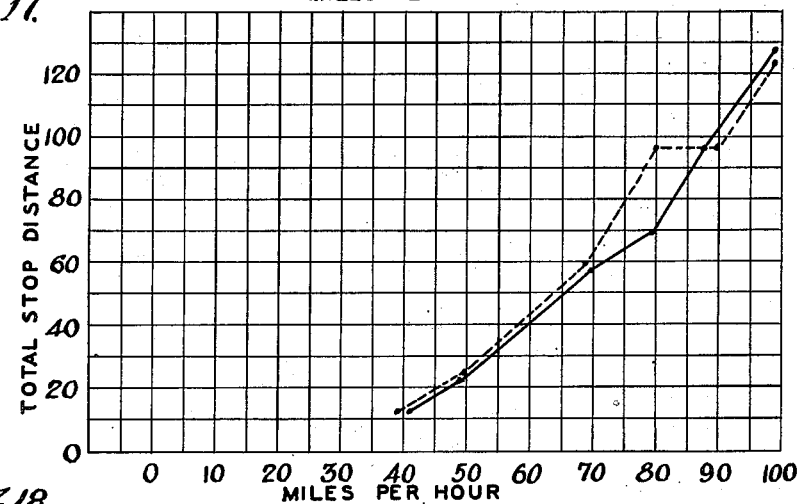

In Figs. 14 and 17 curves representing the total stop distances of two brake shoes are illustrated. Curves representative of total stop distances are particularly useful in comparing different brake shoes since such curves tend to show a resultant condition of the various factors of brake shoe performance.

Miles per hour is plotted on the axis of abscissas for the curves of Figs. 14 and 17 while the total stop distance is plotted in an arbitrary scale on the axis of ordinates of these two curves. The broken-line curves (------) in Figs. 14 and 17 pertain to the same shoes as those to which the broken-line curves of Figs. 13 and 16 pertain, as do the full-line curves (———) of Figs. 14 and 17, that is to say, the broken-line curve (------) in Fig. 14 pertains to a shoe like that shown in Fig. 1 but not having an insert like the insert E incorporated therein and not having heat-resistant carbon incorporated therein whereas the broken-line curve (------) in Fig. 17 pertains to an identical shoe having heat-resistant carbon incorporated therein in the manner shown in Fig. 2. Likewise the full-line curve (———) in Fig. 14 pertains to a shoe like that shown in Fig. 1 and having an insert like the insert E therein but not having heat-resistant carbon incorporated therein while the full-line curve (———) in Fig. 17 pertains to an identical shoe having heat-resistant carbon incorporated therein in the manner shown in Fig. 2. Here again in plotting the curves, shoes cast of metal from the same ladle and having a Brinell hardness of approximately 425 were employed and the shoes were subjected to identical conditions in so far as wheel load, pressure on the shoe, and the like are concerned and further the shoes were of identical dimensions.

Comparison of the curves of Fig. 14 reveals that at a point along each of these curves above seventy miles per hour a sharp decline in the total stop distance occurs. This sharp decline is the result of what has been referred to as an uncontrolled increase in friction. It will be noted that no such sharp decline occurs in the curves of Fig. 17 which demonstrates that the presence of heat-resistant carbon in a brake shoe has a very beneficial effect in so far as uncontrolled increase in friction is concerned.

It is recognized that there is a flattening out in the broken-line curve in Fig. 17 which pertains to a shoe not having an insert such as the insert E therein. However, there is no material alteration in the full-line curve of Fig. 17, which curve pertains to a shoe which does have an insert such as the insert E therein. Comparison of the curves of Fig. 17 therefore shows that the best results are attained when the shoe includes an insert such as the insert E.

The curves of Figs. 14 and 17 were plotted under test condition in the absence of the rolling action of the wheel on the rail. A comparison of these curves reveals that under such conditions the total stop distance is materially less when shoes having heat-resistant carbon incorporated therein are employed except in those instances where there is an uncontrolled increase in friction as exemplified by the sharp declines in the curves of Fig. 14. This demonstrates that the presence of heat-resistant carbon has the effect of increasing the friction of the shoes, total stop distance being directly related to friction of the shoes, other things being equal, as was the circumstance in plotting these curves. Carbon has the tendency to have this effect of increasing the friction over the friction of conventional shoes in all instances except where there is an uncontrolled increase in friction in conventional shoes.

In the presence of the rolling action of the wheel on the rail the above described increase in friction might result in sliding of the wheel along the rail and in lengthening of the total stop distance. Under such circumstances the presence of carbon would have the effect of reducing the tendency toward the development of an uncontrolled increase in friction and therefore the likelihood of sliding the wheel on the rail would be substantially reduced.

Figure 15:
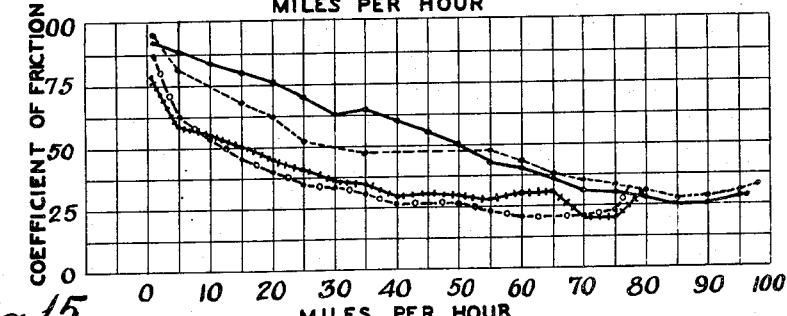
Figure 18:
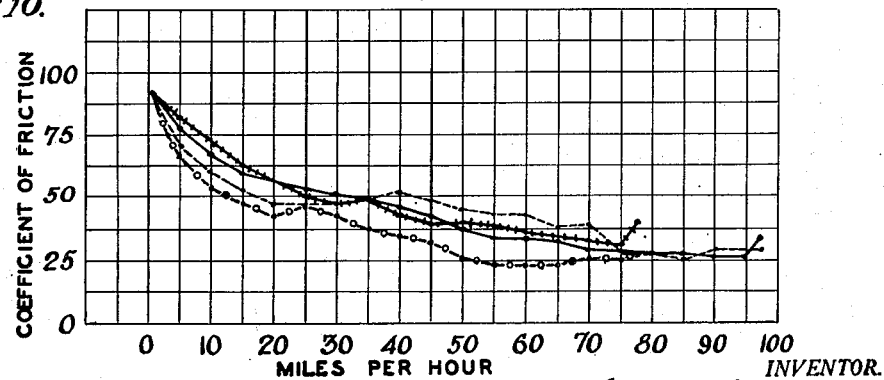

In Figs. 15 and 18 the miles per hour is plotted on the axis of abscissas whereas the coefficient of friction is plotted in an arbitrary scale on the axis of ordinates. Furthermore, in Fig. 15 the full-line curve (————) and the ++++ curve both relate to a shoe like that employed in plotting the full-line curves (————) of Figs. 13 and 14. Likewise, the broken-line curve (——————) and the o—o— curve both relate to a shoe like that employed in plotting the broken-line curves (——————) of Figs. 13 and 14. Moreover, in Fig. 18 the full-line curve (————) and the ++++ curve both relate to a shoe like that employed in plotting the full-line curves (————) of Figs. 16 and 17. Furthermore, in Fig. 18 the broken-line curve (——————) and the o—o— curve both relate to a shoe like that employed in plotting the broken-line curves (——————) of Figs. 16 and 17.

The full-line curves (————) and the broken-line curves (——————) of Figs. 15 and 18 pertain to stops from substantially one hundred miles per hour while the ++++ curves and the o—o— curves pertain to stops from substantially eighty miles per hour.

A comparison of the curves of Figs. 15 and 18 once more demonstrates the superiority under heavy duty braking conditions of shoes having heat-resistant carbon incorporated therein. Thus in Fig. 15 where the curves pertain to shoes not having heat-resistant carbon incorporated therein it will be noted that there is a considerable separation in the curves which means that the friction characteristic of the shoe in a stop from one speed differs from the friction characteristics in a stop from a different speed. However, in Fig. 18 the separation between the curves is considerably reduced, particularly in the case of the shoe having an insert like the insert E therein, which means that when heat-resistant carbon is incorporated in a shoe the friction characteristics of the shoe in stops from different speeds closely correspond wherefore adjustment of the control mechanism will apply for wide range of speed.

Figure 19:
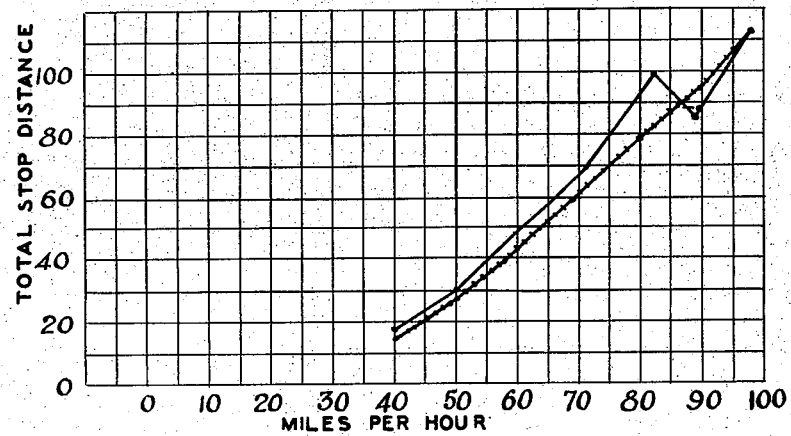
Figure 20:
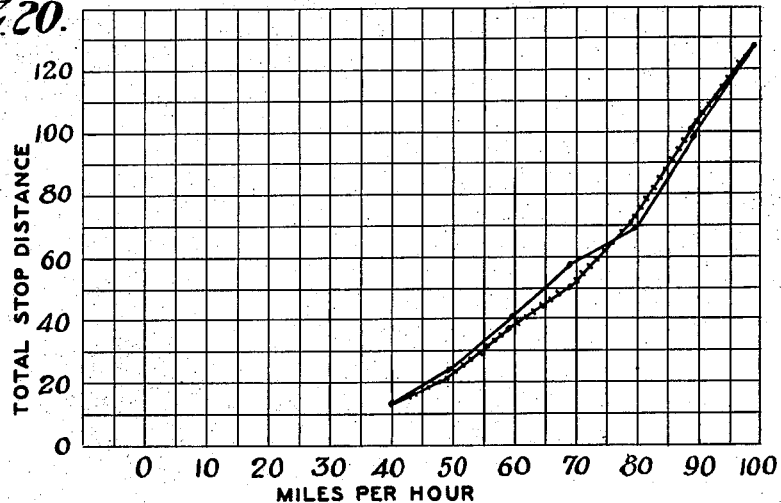

As has been explained heretofore, one method for determining the friction characteristics of a brake shoe is to compare the total stop distances involved in braking operations effected at successively increasing speeds up to a certain top speed and then from this or a greater top speed back through successively decreasing operating speeds. In Figs. 19 and 20 such a comparison of total stop distances is shown. Herein starting at speeds of approximately forty miles per hour the speed was successively increased in steps of ten miles per hour up to approximately one hundred miles per hour and then back through operating speeds successively decreased in steps of ten miles per hour from approximately one hundred miles per hour to forty miles per hour.

In Fig. 19 the full-line curve (————) pertains to the successively increased speeds while the ++++ curve pertains to the successively decreased speeds. Furthermore, these curves pertain to a relatively hard brake shoe, which is to say, one having a Brinell hardness of approximately 425. The shoes to which the curves of Fig. 19 pertain included inserts such as the insert E but did not include heat-resistant carbon.

On the other hand, the respective curves in Fig. 20 corresponding to curves having like characteristics to those in Fig. 19 pertain to the same type of shoe and illustrate the same conditions, that is to say, the full-line curve in Fig. 20 pertains to the same type of shoe as that to which the full-line curve in Fig. 19 pertains and the shoes were subjected to the same conditions in so far as increasing or decreasing speeds are concerned. However, the shoes to which the curves in Fig. 20 pertain included blocks of heat-resistant carbon arranged in the manner shown in Fig. 2.

In plotting the curves of Figs. 19 and 20 cast iron brake shoes of identical dimensions were employed and these shoes were subjected to identical conditions in so far as wheel load, pressure on the shoe, and the like are concerned.

By referring to Fig. 19 it will be seen that there is almost a total lack of uniformity at particular speeds in so far as the operation of the shoe is concerned under successively increasing speeds and then under successively decreasing speeds. On the other hand, the curves of Fig. 20 closely correspond and indicate that there is close correspondence of operation at particular speeds in successively increasing speeds and successively decreasing speeds. Comparison of the curves of Figs. 19 and 20 markedly demonstrates the beneficial effects accruing from the presence of heat-resistant carbon in brake shoes for these curves indicate that the total stop distance from a particular speed will be of substantially the same length.

The shoes to which the curves of Figs. 13 to 20 pertain were, as has been explained, relatively hard. It is to be distinctly understood, however, that my invention is by no means limited to relatively hard shoes especially since, in some circumstances, the use of relatively soft shoes will be particularly beneficial. Thus, the particular hardness or softness of the shoes is of no especial importance in so far as obtaining the desirable results of my invention are concerned for the ue of carbon as explained herein in shoes of any hardness will be beneficial.

The curves of Figs. 13 to 20, inclusive, and which pertain to shoes including heat-resistant carbon have been explained as pertaining to shoes having blocks of heat-resistant carbon incorporated therein in the manner shown in Fig. 2. However, beneficial results are also realized by arranging blocks or the like of heat-resistant carbon in the manner shown in Figs. 5 to 12, inclusive. None of the other arrangements illustrated may be as efficacious as that of the arrangement shown in Fig. 2 although, as stated heretofore, satisfactory results are realized by utilizing these other arrangements and in any instance the results are superior to those results attained where resort is not had to the presence of heat-resistant carbon.

It is believed that the best results will be obtained if the area of exposed heat-resistant carbon is from five percent to twenty-five percent of the area of the friction surface of the brake shoe depending upon the results desired. In the shoe shown in Fig. 2 the area of exposed carbon is from ten percent to twelve percent of the friction surface of the brake shoe. However, these are circumstances where variations from these particular percentages are desirable and hence the foregoing is not to be taken as a limitation of my invention.

In order to obtain the most efficient brake operation, especially in emergency stops, it is desirable to so arrange the brake equipment that the friction between the wheel and shoe will be near the minimum value generally accepted as the friction between the wheel and rail. When a conventional shoe is used under such conditions and the above-described uncontrolled increase in friction arises the friction between the shoe and the wheel may become greater than the friction between the wheel and the rail whereupon the wheel will be slid along the rail. To avoid this condition it has been customary to operate under such conditions that the friction between the wheel and the shoe is substantially less than the minimum value generally accepted as the friction between the wheel and the rail so that if the above-described uncontrolled increase in friction does arise the wheel will not be slid along the rail. However, when my improved shoe is used the friction between the wheel and the shoe may be kept near the minimum value generally accepted as the friction between the wheel and the rail since the tendency toward development of uncontrolled increase in friction is substantially eliminated in my improved shoe and therefore more efficient brake operation results from the use of my novel shoe.

From the foregoing it is believed to be apparent that my invention enables me to effect a substantial reduction in the rate of wear of brake shoes particularly under heavy duty braking conditions and that also the invention renders the friction characteristics of a brake shoe substantially uniform. Moreover, by reason of my invention, I am enabled to reduce the length of the total stop distance that can be obtained when the above-described flaming condition does not arise with its attendant increase in the rate of wear. Furthermore, attendant to rendering the friction characteristics of a brake shoe substantially uniform is the fact that I am enabled to reduce the tendency of a shoe to display an uncontrolled increase in friction.

The foregoing detailed description of my invention particularly pertains to the incorporation of heat-resistant carbon in conventional railway brake shoes. However, as has been stated heretofore, my invention is not limited to shoes of this construction and adapted for such usage. Conventional railway brake shoes are applied to the treads of the wheels of the equipment on which the shoes are provided but my invention is not limited to this type of brake couple.

For example, my invention may be incorporated advantageously in a so-called disc brake of which the brake couple fragmentally illustrated in Fig. 21 is exemplary. This brake couple includes a ferrous metal disc D, Figs. 21, 22 and 23, which is mounted for rotation with a device (not shown) that is to be decelerated when the aligned ferrous metal shoes T, which constitute a pair, are forced against opposite faces of the disc D. As is understood by those skilled in the art, other pairs of shoes T may be provided at spaced intervals about the disc D and such pairs of shoes, as well as the illustrated pair, are supported for movement toward and away from opposite faces of the disc, and suitable means (not shown) are provided for forcing the shoes against the disc to thereby effect deceleration of the disc and the device with which it is connected.

It is to be understood that the disc brake couple shown in Fig. 21 and described in detail herein is but a single form of such brake couples. It is not at all unusual in disc brake couples for the shoes to be applied to one or the other of the faces of the discs with which the shoes cooperate as well as to both faces of the discs as shown in Fig. 21. For example, in one form of such brake couples that has been used on railway equipment, the shoes are applied to but one of the faces of the discs with which they respectively cooperate. Thus it is to be remembered that the disc brake couple herein shown and described is merely illustrative of such brake couples generally.

Moreover, in so far as the disc brake couples are concerned, the term "shoe" is used herein in a generic sense, that is to say, this term not only refers to shoes as such, (for example, as illustrated in Fig. 21) but applies to the applied element or elements of such brake couples in whatever form such element or elements may assume. Thus, the "shoe" of such a brake couple might be a continuous or discontinuous annular ring or it might be a disc. For example, one disc might be applied against another or two discs might be applied against an interposed disc. Thus "shoe" as used herein with reference to disc brake couples, refers to an element of such a couple that is to be applied against another element of the couple or to what might be called the stationary element of the couple in contradistinction to the moving element or the element that is to be decelerated.

In the form of my invention shown in Figs. 21, 22 and 23 heat-resistant carbon is incorporated in the shoes T of the illustrated brake couple as by being cast in place therein. In this instance each block C is in the form of a truncated cone, which is to say, each block is circular in cross section and includes two flat faces of which one is of greater diameter than the other. The smaller of the two flat faces lies in the wearing face of the shoe whereby displacement of the block from the shoe is prevented. It is to be understood, however, that each block could be frusto-pyramidal or of other form within the purview of my invention.

As best shown in Fig. 23, the blocks C are arranged in circumferential rows but radially of the shoe the blocks in adjacent rows are disposed out of alignment with each other. The arrangement shown is such that the blocks in one row are disposed midway between two blocks in the adjacent row radially of the shoe. In this arrangement, of course, blocks in alternate circumferential rows will be in alignment with each other radially of the shoe.

In the form of my invention shown in Fig. 24 blocks C1 of heat-resistant carbon are incorporated in the shoe T1 as by being cast in place therein to extend radially of the shoe, the blocks being aligned with each other circumferentially of the shoe. These blocks are tapered similarly to the block B shown in Fig. 4 and the smaller faces of the blocks lie in the wearing face of the shoe.

In Fig. 25 blocks C2 are provided in the shoe T2 as by being cast in place therein and here the blocks are of arcuate form longitudinally so that they may be arranged in rows extending circumferentially of the shoe, the blocks in each row being spaced one from the other and the blocks in one row being disposed to extend across the gaps between blocks in the adjacent rows. It may be desirable in this instance to have the ends of the blocks in adjacent circumferential rows in overlapping relation radially of the shoe as is shown in Fig. 25 although this is not essential. The blocks C2, as the block B shown in Fig. 4, are tapered and the smaller faces thereof lie in the wearing face of the shoe T2 whereby displacement of the blocks from the shoe is prevented.

It will be noted that in each of the forms of my invention shown in Figs. 21 to 25, inclusive, heat-resistant carbon is incorporated in the shoe of the brake couple and so to do produces results comparable to those described heretofore with reference to Figs. 13 to 20. It is not to be understood, however, that my invention is limited to the incorporation of heat-resistant carbon in the shoes of a brake couple.

Thus, in Fig. 26 I have shown the carbon provided in the disc of a disc brake couple. Here blocks C3 of heat-resistant carbon are incorporated in the disc D3 as by being cast in place therein. These blocks are in the form of a pair of truncated cones, which is to say, each block is circular in cross section and includes two flat faces of substantially equal diameter which are disposed to lie in opposite faces of the disc D3 and the sides of the block are inclined away from the opposite flat faces and the center line of the block in a converging manner to meet substantially midway between the flat faces at the ends of the block, whereby the diameter of the block at the point of convergence is greater than the diameters of the aforesaid flat faces lying in the opposite faces of the disc. Of course, two frusto-conical blocks could be provided in alignment with each other and each of these blocks could extend substantially half-way through the disc D3 so that the larger of the flat faces of such blocks would engage midway between the faces of the disc. In either event because the smallest face of a block is disposed in a face of the disc it is apparent that displacement of the block from the disc is prevented.

The blocks C3 may be arranged in the disc D3 in the manner shown in Fig. 23 and these blocks are to be positioned in that part of the disc against which the shoes as T3 bear. Of course, blocks such as are shown in Figs. 24 and 25 could be provided in that part of the disc D3 against which the shoes as T3 bear and such blocks could be arranged as shown in Figs. 24 and 25.

A further modification is illustrated in Fig. 27 and herein blocks C4 are provided in the disc D4 which is similar to the disc D and against which shoes similar to the shoes T may bear. In this instance the blocks C4 are frusto-conical in form and are mounted in the disc D4 as by being cast in place therein so that the smaller of the opposite flat faces of each block lies in one or the other of the faces of the disc whereby displacement of the blocks from the disc is prevented. Here again the blocks may be arranged in rows circumferentially of the disc but here, in such an instance, the blocks in adjacent rows would be aligned with each other radially of the disc. However, here the blocks in adjacent circumferential rows have the smaller faces thereof disposed in opposite faces of the disc. Furthermore, the arrangement shown in Fig. 27 is such that in a given radial row the blocks in alternate circumferential rows have the smaller ends thereof disposed in one face of the disc while the block or blocks in the adjacent circumferential row or rows have the smaller end thereof disposed in the opposite face of the disc. In the radial rows adjacent such a given radial row the blocks in said alternate circumferential rows have the smaller diameters thereof disposed in said opposite face of the disc while the block or blocks in said adjacent circumferential row or rows have the smaller diameters disposed in said one face of the disc. While this particular arrangement of blocks is shown in Fig. 27 it will be recognized that many other arrangements may be resorted to without departing from the ambit of my invention, and furthermore blocks of frusto-pyramidal or other form may be used instead of the frusto-conical blocks shown.

The arrangement of blocks of heat-resistant carbon in the manner shown in Fig. 27 exposes less carbon on the faces of the disc than the arrangements shown in Figs. 23, 24 and 25, but in any of these instances heat-resistant carbon is exposed on the face of a brake element to produce beneficial results in a braking operation comparable to those described heretofore with reference to Figs. 13 to 20. Furthermore, whether the carbon is in the shoe or in the disc, the amount of carbon to be exposed on the face of a brake element is adjusted according to the service to which the brake couple is to be put and that arrangement of carbon is resorted to which will best produce the desired results in the particular use. Hence, in some instances a greater or less number of blocks than illustrated and described may be provided and which may be arranged in a greater or less number of rows both circumferentially and radially of the shoe or disc or in some other desired or suitable arrangement and, furthermore, blocks of a variety of shapes may be utilized if desired or required.

The blocks shown in Figs. 25 and 26 may extend entirely through the disc in which they are mounted as shown in Fig. 22 or they may be arranged to extend but part way through the disc as shown in Fig. 24, either of these arrangements being suitable, and resort should be had to whichever arrangement best meets the particular usage to which the brake couple is to be put. The provision of heat-resistant carbon in a disc in accordance with the disclosure in Figs. 25 and 26 or in analogous arrangements also has beneficial results in braking operations comparable to those hereinabove described, and the arrangement of the blocks and the number thereof will be determined by the conditions which will be encountered in the course of the braking operations in which the brake couple embodying the element or elements containing the carbon are used.

Of course the carbon could be provided in both elements of the brake couple. Thus, in Fig. 27 I have shown a disc D5, which is similar to the disc D, as having blocks of heat-resistant carbon C5 incorporated therein in the same manner as such blocks shown incorporated in the disc D3, Fig. 26. I have likewise shown shoes T5, which are similar to the shoes T, and which, like the shoes T shown in Fig. 22, have blocks C5 of heat-resistant carbon incorporated therein. It is to be understood, however, that my invention is not limited to the specific arrangement of the blocks shown in Fig. 27 for any arrangement of the blocks in both elements of the couple may be resorted to, the arrangement and number of the blocks being determined by the service to which the brake is to be put, as has been explained heretofore.

As a further example of the utilization of my invention in a brake couple, in Fig. 29 I have shown a brake couple comprising a drum Y of ferrous metal against the inner periphery of the flange of which shoes Z, of ferrous metal and mounted for pivotal movement about studs X, may bear, said shoes normally being urged away from the drum Y by a spring U so that foot portions V on the shoes Z are forcibly held against pistons (not shown) in opposite end portions of the cylinder A to which a fluid under pressure is supplied through a supply pipe E. When fluid under pressure is supplied to the cylinder A the aforesaid pistons against which the foot portions V bear are forced outwardly and thereby the shoes Z are forced against the drum Y to effect deceleration. It will be understood that while I have thus illustrated what is called in the art an internal expanding brake as an example of a so-called drum brake my invention is equally applicable to a so-called external contracting brake. Here again, as in the case of the disc brake, heat-resistant carbon may be incorporated in either or both of the brake elements, that is to say, in either or both the drum Y or the shoes Z.

Thus in Fig. 30, which is a section through the drum Y and one of the shoes Z shown in Fig. 29, blocks K of heat-resistant carbon and in the form of truncated cones are provided in the shoes Z. In Fig. 33 a drum Y1 and a shoe Z1, similar to the drum Y and the shoes Z, are shown and here blocks K1 of heat-resistant carbon in the form of truncated cones are provided in the drum Y1. In Fig. 34 a drum Y2 and a shoe Z2, similar to the drum Y and the shoes Z, are shown and herein blocks K2 of heat-resistant carbon in the form of truncated cones are provided in both the drum Y2 and the shoes Z2. The blocks K, K1 and K2 may be cast in place in the elements in which they are provided and the smaller of the opposite flat faces of the blocks are disposed to lie in the wearing faces of the elements whereby displacement of the blocks from the elements is prevented. By way of example, the blocks K, K1 and K2 may be arranged in the element in which they are included in the manner shown in Fig. 31.

The provision of heat-resistant carbon in the elements of a brake couple such as that shown in Fig. 29 has the beneficial effects in braking operations hereinabove described. Furthermore, it is to be understood that it is not essential that the heat-resistant carbon be incorporated in one or the other or both of the elements of such a brake couple in blocks of truncated conical form for obviously blocks of pyramidal form could be employed. Also whether the heat-resistant carbon is provided in the drum or in a shoe or in both of such elements and whether blocks of such carbon are arranged in the manner shown in Fig. 31 will be determined by the service to which the brake couple is to be put and that arrangement will be resorted to which is most suitable for the conditions of use. Furthermore, it will be understood that blocks K3 could be arranged in the shoe Z3 or in the drum in the manner shown in Fig. 32 or in other arrangement such as have, for example, been described hereinabove.

Thus far I have described that heat-resistant carbon may be incorporated in conventional railway brake shoes adapted to cooperate with the treads of the wheels of the equipment on which the shoes are used and that heat-resistant carbon may also be incorporated in either or both of the elements of so-called disc and drum brake couples, but it is to be understood that my invention may also be used in other brake couples. For example, in the patent to Howe 265,262, patented October 3, 1882, there is shown a car wheel having what is called a brake-rim secured thereto and as will be understood by those skilled in the art such a brake-rim might be integral with the car wheel as well as being separate from and attached thereto as shown in said Howe patent. Brake shoes such as, for example, like those shown in Fig. 1 may be arranged to cooperate with such a brake-rim to effect deceleration instead of having the shoes cooperate with the treads of the wheels. In such an arrangement heat-resistant carbon could be provided in the brake shoes as hereinabove described or it could be provided in the brake-rim and in some instances it might be advantageous to provide the heat-resistant carbon in both the shoes and the brake-rim.

It will be seen from the foregoing description that my invention is susceptible of use in a wide variety of brake couples to bring about beneficial results such as those hereinabove described with reference to the charts shown in Figs. 13 to 20, inclusive.

In explaining my invention I have referred to cast iron brake shoes but it is to be understood that the presence of heat-resistant carbon is beneficial in all ferrous metal brake elements. Furthermore, I have explained that blocks of heat-resistant carbon are utilized, reference also having been made to truncated cones of heat-resistant carbon which are, of course, a form of blocks, and it is to be understood that my invention is not limited merely to the incorporation of blocks of such material in the bodies of brake shoes or other brake elements for my invention primarily resides in the utilization of the benefits to be derived by reason of the inclusion of carbon in the body of a brake element so as to expose carbon on the wearing face of the element.

Thus while I have illustrated and described preferred embodiments of my invention it is to be understood that the invention is capable of variation and modification and I therefore do not wish to be limited to the precise details set forth but desire to avail myself of such changes and alterations as fall within the purview of the following claims.

I claim:

1. A brake element comprising a ferrous metal body providing a wearing face and having heat-resistant carbon included in the body thereof to remain exposed on said wearing face as the element wears away in use, the carbon being characterized by having a compressive strength of the order of about 1000 to 9000 pounds per square inch and a tensile strength of the order of about 800 to 1600 pounds per square inch.

2. A brake element comprising a ferrous metal body providing a wearing face and having at least one block of heat-resistant carbon included in the body thereof to remain exposed on said wearing face as the element wears away in use, the block being characterized by having a compressive strength of the order of about 1000 to 9000 pounds per square inch and a tensile strength of the order of about 800 to 1600 pounds per square inch.

3. A brake element comprising a ferrous metal body providing a wearing face and having members of heat-resistant carbon distributed throughout said body in spaced relation with each other and mounted in said body to remain exposed on said wearing face as the element wears away in use, each of said members being characterized by having a compressive strength of the order of about 1000 to 9000 pounds per square inch and a tensile strength of the order of about 800 to 1600 pounds per square inch.

4. A brake element comprising a ferrous metal body providing a wearing face and having members of heat-resistant carbon cast in place in said body to remain exposed on said wearing face as the element wears away in use, each of said members being characterized by having a compressive strength of the order of about 1000 to 9000 pounds per square inch and a tensile strength of the order of about 800 to 1600 pounds per square inch.

5. A brake shoe for use on railway equipment and the like and comprising a cast ferrous metal body providing a wearing face and having blocks of heat-resistant carbon cast in place in the body in spaced relation, said blocks extending into said body to remain exposed on said wearing face as the shoe wears away in use, the blocks being characterized by having a compressive strength of the order of about 1000 to 9000 pounds per square inch and a tensile strength of the order of about 800 to 1600 pounds per square inch.

6. A brake shoe for use on railway equipment and the like and comprising a cast ferrous metal body providing a wearing face and having at least one block of heat-resistant carbon cast in place in said body and extended into said body to remain exposed on said wearing face as the shoe wears away in use, the block being characterized by having a compressive strength of the order of about 1000 to 9000 pounds per square inch and a tensile strength of the order of about 800 to 1600 pounds per square inch.

7. A brake shoe for use on railway equipment and the like and comprising a ferrous metal body providing a wearing face and having blocks of heat-resistant carbon mounted in the body in spaced relation, said blocks extending into said body to remain exposed on said wearing face as the shoe wears away in use, said blocks being arranged in sets, the blocks of each set being so positioned that the adjacent edges thereof are substantially in alignment longitudinally of the shoe, the blocks being characterized by having a compressive strength of the order of about 1000 to 9000 pounds per square inch and a tensile strength of the order of about 800 to 1600 pounds per square inch.

8. A brake shoe for use on railway equipment and the like and comprising a cast ferrous metal body providing a wearing face and having blocks of heat-resistant carbon cast in place in the body in spaced relation, the blocks extending into said body to remain exposed on said wearing face as the shoe wears away in use, said blocks being arranged in sets and the sets of said blocks being positioned on opposite sides of the longitudinal center line of the shoe, the blocks being characterized by having a compressive strength of the order of about 1000 to 9000 pounds per square inch and a tensile strength of the order of about 800 to 1600 pounds per square inch.

9. A brake shoe for use on railway equipment and the like and comprising a cast ferrous metal body providing a wearing face and having blocks of heat-resistant carbon cast in place in the body in spaced relation, the blocks extending into said body to remain exposed on said wearing face as the shoe wears away in use, said blocks being arranged in sets, the blocks of each set being so positioned that the adjacent edges thereof are substantially in alignment longitudinally of the shoe, the blocks being characterized by having a compressive strength of the order of about 1000 to 9000 pounds per square inch and a tensile strength of the order of about 800 to 1600 pounds per square inch.

10. A brake shoe for use on railway equipment and the like and comprising a cast iron body providing a wearing face and having blocks of heat-resistant electro-graphitic material cast in place in the body in spaced relation, said blocks extending into said body to remain exposed on said wearing face as the shoe wears away in use, the blocks being characterized by having a compressive strength of the order of about 1000 to 9000 pounds per square inch and a tensile strength of the order of about 800 to 1600 pounds per square inch.

11. A brake shoe for use on railway equipment and the like and comprising a ferrous metal body providing a wearing face and having blocks of heat-resistant carbon mounted in the body in spaced relation, said blocks extending into said body to remain exposed on said wearing face as the shoe wears away in use, the exposed area of said blocks on said wearing face being from five to twenty-five per cent of the area of the face, the blocks being characterized by having a compressive strength of the order of about 1000 to 9000 pounds per square inch and a tensile strength of the order of about 800 to 1600 pounds per square inch.

12. A brake shoe for use on railway equipment and the like and comprising a ferrous metal body providing a wearing face and having blocks of heat-resistant carbon mounted in said body to remain exposed on said wearing face as the shoe wears away in use, the exposed area of said blocks on said wearing face being from ten to twelve percent of the area of said face, the blocks being characterized by having a compressive strength of the order of about 1000 to 9000 pounds per square inch and a tensile strength of the order of about 800 to 1600 pounds per square inch.

13. A brake shoe for use on railway equipment and the like and comprising a cast iron body providing a wearing face and having blocks of heat-resistant carbon cast in place in the body in spaced relation, said blocks extending into said body to remain exposed on said wearing face as the shoe wears away in use, the exposed area of said blocks on said wearing face being from five to twenty-five percent of the area of the face, the blocks being characterized by having a compressive strength of the order of about 1000 to 9000 pounds per square inch and a tensile strength of the order of about 800 to 1600 pounds per square inch.

14. A brake shoe for use on railway equipment and the like and comprising a cast iron body providing a wearing face and having blocks of heat-resistant electro-graphitic material cast in place in the body in spaced relation, said blocks extending into said body to remain exposed on said wearing face as the shoe wears away in use, the exposed area of said blocks on said wearing face being from ten to twelve percent of the area of said face, the blocks being characterized by having a compressive strength of the order of about 1000 to 9000 pounds per square inch and a tensile strength of the order of about 800 to 1600 pounds per square inch.

15. A brake element comprising a ferrous metal body providing a wearing face and having blocks of heat-resistant carbon mounted in the body in spaced relation, said blocks extending into said body to remain exposed on said wearing face as the element wears away in use, said blocks being arranged in sets and the sets of blocks being positioned on opposite sides of the longitudinal center line of the element, the blocks being characterized by having a compressive strength of the order of about 1000 to 9000 pounds per square inch and a tensile strength of the order of about 800 to 1600 pounds per square inch.

16. A brake element comprising a ferrous metal body providing a wearing face and having blocks of heat-resistant carbon mounted in the body in spaced relation, said blocks extending into said body to remain exposed on said wearing face as the element wears away in use, said blocks being arranged in sets, the blocks of each set being so positioned that adjacent edges thereof are in substantial alignment longitudinally of the element, the blocks being characterized by having a compressive strength of the order of about 1000 to 900 pounds per square inch and a tensile strength of the order of about 800 to 1600 pounds per square inch.

17. A brake element comprising a ferrous metal body providing a wearing face and having blocks of heat-resistant carbon mounted in the body in spaced relation, said blocks extending into said body to remain exposed on said wearing face as the element wears away in use, said blocks being so distributed in said body that parts thereof are in overlapping relation longitudinally of the element, the blocks being characterized by having a compressive strength of the order of about 1000 to 9000 pounds per square inch and a tensile strength of the order of about 800 to 1600 pounds per square inch.

18. A brake element comprising a ferrous metal body providing a wearing face and having heat-resistant electro-graphitic material included in the body thereof to remain exposed on said wearing face as the element wears away in use, the material being characterized by having a compressive strength of the order of about 1000 to 9000 pounds per square inch and a tensile strength of the order of about 800 to 1600 pounds per square inch.

19. A brake couple including ferrous metal elements each comprising a body providing a wearing face and having heat-resistant carbon included in the body thereof to remain exposed on said wearing face as the element wears away in use, the carbon being characterized by having a compressive strength of the order of about 1000 to 9000 pounds per square inch and a tensile strength of the order of about 800 to 1600 pounds per square inch.

20. A brake couple including ferrous metal elements each comprising a body providing a wearing face and having at least one block of heat-resistant carbon cast in place in the body thereof and extended into said body to remain exposed on said wearing face as the element wears away in use, such block being characterized by having a compressive strength of the order of about 1000 to 9000 pounds per square inch and a tensile strength of the order of about 800 to 1600 pounds per square inch.

21. A disc brake couple comprising a disc element and a shoe element engageable with the disc, at least one of said elements being made of ferrous metal and having heat-resistant carbon included therein to remain exposed on the face of said element as it wears away in use, the carbon being characterized by having a compressive strength of the order of about 1000 to 9000 pounds per square inch and a tensile strength of the order of about 800 to 1600 pounds per square inch.

22. A disc brake couple comprising a disc element and a shoe element engageable with the disc, said disc and shoe elements being made of ferrous metal and having heat-resistant carbon included therein to remain exposed on the faces thereof as the elements wear away in use, the carbon being characterized by having a compressive strength of the order of about 1000 to 9000 pounds per square inch and a tensile strength of the order of about 800 to 1600 pounds per square inch.

23. A disc brake couple comprising a disc element and a shoe element engageable with the disc, at leasts one of said elements being made of ferrous metal and having blocks of heat-resistant carbon cast in place therein to remain exposed on the face of said element as it wears away in use, the carbon being characterized by having a compressive strength of the order of about 1000 to 9000 pounds per square inch and a tensile strength of the order of about 800 to 1600 pounds per square inch.

24. A disc brake couple comprising a disc element and a shoe element engageable with the disc, at least one of said elements being made of ferrous metal and having heat-resistant electro-graphitic material included therein to remain exposed on the face of said element as it wears away in use, the material being characterized by having a compressive strength of the order of about 1000 to 9000 pounds per square inch and a tensile strength of the order of about 800 to 1600 pounds per square inch.

25. A drum brake couple comprising as the elements thereof a drum and at least one shoe engageable with the drum, at least one of said elements being made of ferrous metal and having heat-resistant carbon included therein to remain exposed on the face of said element as it wears away in use, the carbon being characterized by having a compressive strength of the order of about 1000 to 9000 pounds per square inch and a tensile strength of the order of about 800 to 1600 pounds per square inch.

26. A drum brake couple comprising as the elements thereof a drum and at least one shoe engageable with the drum, at least one of said elements being made of ferrous metal and having blocks of heat-resistant carbon cast in place therein to remain exposed on the face of said element as it wears away in use, the blocks being characterized by having a compressive strength of the order of about 1000 to 9000 pounds per square inch and a tensile strength of the order of about 800 to 1600 pounds per square inch.

27. A drum brake couple comprising as the elements thereof a drum and at least one shoe engageable with the drum, at least one of said elements being made of ferrous metal and having heat-resistant electro-graphitic material included therein to remain exposed on the face of said element as it wears away in use, the material being characterized by having a compressive strength of the order of about 1000 to 9000 pounds per square inch and a tensile strength of the order of about 800 to 1600 pounds per square inch.

28. A brake element comprising a ferrous metal body providing a wearing face and having heat-resistant carbon included in the body thereof to remain exposed on said wearing face as the element wears away in use, the carbon being characterized by having a compressive strength of the order of about 1000 to 9000 pounds per square inch and a tensile strength of the order of about 800 to 1600 pounds per square inch and having an electrical resistance over a range from about .0003 to about .002 ohm per inch cube.

29. A brake element comprising a ferrous metal body providing a wearing face and having heat-resistant carbon included in the body thereof to remain exposed on said wearing face as the element wears away in use, the carbon being characterized by having a compressive strength of the order of about 1000 to 9000 pounds per square inch and a tensile strength of the order of about 800 to 1600 pounds per square inch and having hardness as measured on the Shore sceleroscope of the order of about 15 to about 100.

30. A brake element comprising a ferrous metal body providing a wearing face and having heat-resistant carbon included in the body thereof to remain exposed on said wearing face as the element wears away in use, the carbon being characterized by having a compressive strength of the order of about 1000 to 9000 pounds per square inch and a tensile strength of the order of about 800 to 1600 pounds per square inch and having an apparent density of about 1.4 to about 1.7 and a weight in pounds per cubic foot from about 90 to about 110.

31. A brake element comprising a ferrous metal body providing a wearing face and having heat-resistant carbon included in the body thereof to remain exposed on said wearing face as the element wears away in use, the carbon being characterized by having a compressive strength of the order of about 1000 to 9000 pounds per square inch and a tensile strength of the order of about 800 to 1600 pounds per square inch, an electrical resistance over a range from about .0003 to about .002 ohm per inch cube, and having hardness as measured on the Shore sceleroscope of the order of about 15 to about 100.

32. A brake element comprising a ferrous metal body providing a wearing face and having heat-resistant carbon included in the body thereof to remain exposed on said wearing face as the element wears away in use, the carbon being characterized by having a compressive strength of the order of about 1000 to 9000 pounds per square inch and a tensile strength of the order of about 800 to 1600 pounds per square inch, an electrical resistance over a range from about .0003 to about .002 ohm per inch cube, and having an apparent density of about 1.4 to about 1.7 and a weight in pounds per cubic foot from about 90 to about 110.

33. A brake element comprising a ferrous metal body providing a wearing face and having heat-resistant carbon included in the body thereof to remain exposed on said wearing face as the element wears away in use, the carbon being characterized by having a compressive strength of the order of about 1000 to 9000 pounds per square inch and a tensile strength of the order of about 800 to 1600 pounds per square inch, an electrical resistance over a range from about .0003 to about .002 ohm per inch cube, hardness as measured on the Shore sceleroscope of the order of about 15 to about 100, and having an apparent density of about 1.4 to about 1.7 and a weight in pounds per cubic foot from about 90 to about 110.

34. A brake element comprising a ferrous metal body providing a wearing face and having heat-resistant carbon included in the body thereof to remain exposed on said wearing face as the element wears away in use, the carbon being characterized by having a compressive strength of the order of about 1000 to 9000 pounds per square inch and a tensile strength of the order of about 800 to 1600 pounds per square inch, hardness as measured on the Shore sceleroscope of the order of about 15 to about 100 and having an apparent density of about 1.4 to about 1.7 and a weight in pounds per cubic foot from about 90 to about 110.

ROSSER L. WILSON.